US012283748B2

(12) United States Patent
Liu et al.

(10) Patent No.: US 12,283,748 B2
(45) Date of Patent: Apr. 22, 2025

(54) MULTI-DIRECTIONAL RADIATION LEAKY COAXIAL CABLE

(71) Applicant: Jiangsu Hengxin Technology Co., Ltd, Yixing (CN)

(72) Inventors: Zhonghua Liu, Yixing (CN); Zhaobo Cai, Yixing (CN); Yongjian Chen, Yixing (CN); Chao Wu, Yixing (CN); Wei Wei, Yixing (CN)

(73) Assignee: Jiangsu Hengxin Technology Co., Ltd, Yixing (CN)

( * ) Notice: Subject to any disclaimer, the term of this patent is extended or adjusted under 35 U.S.C. 154(b) by 337 days.

(21) Appl. No.: 17/787,451

(22) PCT Filed: Dec. 15, 2021

(86) PCT No.: PCT/CN2021/138200
§ 371 (c)(1),
(2) Date: Jun. 20, 2022

(87) PCT Pub. No.: WO2022/166416
PCT Pub. Date: Aug. 11, 2022

(65) Prior Publication Data
US 2023/0344136 A1 Oct. 26, 2023

(30) Foreign Application Priority Data
Feb. 3, 2021 (CN) ......................... 202110150370.3

(51) Int. Cl.
*H01B 11/18* (2006.01)
*H01Q 13/20* (2006.01)

(52) U.S. Cl.
CPC ....... *H01Q 13/203* (2013.01); *H01B 11/1808* (2013.01)

(58) Field of Classification Search
CPC .......................... H01Q 13/203; H01B 11/1808
See application file for complete search history.

(56) References Cited

U.S. PATENT DOCUMENTS 2,756,421 A 7/1956 Harvey et al.
5,546,096 A * 8/1996 Wada .................. H01Q 13/203
343/770

(Continued)

FOREIGN PATENT DOCUMENTS

CN 101573836 A 11/2009
CN 204966704 U 1/2016

(Continued)

OTHER PUBLICATIONS

International Search Report and Written Opinion issued in PCT/CN2021/138200 dated Feb. 25, 2022, and English Translation therof.

(Continued)

*Primary Examiner* — Quan Tra
(74) *Attorney, Agent, or Firm* — ARC IP Law, PC; Joseph J. Mayo

(57) ABSTRACT

A multi-directional radiation leaky coaxial cable, including an inner conductor, an insulating layer, an outer conductor and a sheath which are sequentially and coaxially nested from inside to outside. The outer conductor is provided with at least two rows of slotted hole groups, the at least two rows of slotted hole groups are distributed at different angles in a circumferential direction of the outer conductor, and each row of slotted hole group includes a plurality of slotted hole arrays which are periodically arranged along an axial direction of the outer conductor. Each slotted hole array includes a plurality of slotted holes, pitches of the slotted hole groups are the same, and a periodic arrangement difference of two adjacent rows of slotted hole groups in the circumferential direction is half a pitch, such that a phase difference of respective excitation electric fields is 180°.

9 Claims, 3 Drawing Sheets

(56) References Cited

U.S. PATENT DOCUMENTS

| | | | | |
|---|---|---|---|---|
| 6,292,072 | B1 * | 9/2001 | Bode | H01Q 13/203 333/237 |
| 11,069,981 | B2 | 7/2021 | Raya et al. | |
| 2010/0001817 | A1 * | 1/2010 | Suzuki | H01Q 13/203 333/237 |
| 2011/0234338 | A1 | 9/2011 | Takahashi | |

FOREIGN PATENT DOCUMENTS

| | | | | |
|---|---|---|---|---|
| CN | 108808255 | A | 11/2018 | |
| CN | 110520941 | A | 11/2019 | |
| CN | 210092360 | U | 2/2020 | |
| CN | 112886256 | A | 6/2021 | |
| WO | 2016/035857 | | 3/2016 | |
| WO | WO-2022162037 | A1 * | 8/2022 | H01Q 13/203 |

OTHER PUBLICATIONS

International Search Report and Written Opinions of the International Searching Authority issued for the PCT application No. PCT/CN2021/079558 on Oct. 26, 2021, with English translation.

* cited by examiner

MULTI-DIRECTIONAL RADIATION LEAKY COAXIAL CABLE

CROSS-REFERENCE TO RELATED APPLICATIONS

This application is a national stage filing under 35 U.S.C. § 371 of International Application Number PCT/CN2021/138200, filed Dec. 15, 2021, which claims the priority of Chinese patent application No. 2021101503703 filed Feb. 3, 2021. The contents of these applications are incorporated herein by reference in their entirety.

TECHNICAL FIELD

The disclosure relates to technology for designing a leaky coaxial cable, and more particularly, to a multi-directional radiation leaky coaxial cable.

BACKGROUND

The radiation of a radiation leaky cable is directional, and generally, the strongest signal can be received at a position oriented to a slotted hole of the leaky cable. With the increase of an included angle with an orientation of the slotted hole, intensity of the received signal is gradually decreased, and this characteristic may also be measured by a width of a radiation lobe. Generally at frequency band higher than 2,000 MHz, a lobe width of 3 dB is ±45° (which is namely 90°) and a lobe width of 5 dB is ±60° (which is namely 120°) (note: from an application point of view, the lobe width herein is based on 95% coupling loss in a circumferential direction at 2 m of the leaky cable, and from a far-field pattern of the leaky cable only, the lobe width of 3 dB is about 120°).

For a traditional tunnel application, this characteristic of the leaky cable may be satisfied by a conventional leaky cable due to a zonally distributed tunnel scenario, a fixed receiving end, and a low requirement for a transverse radiation lobe of the leaky cable. However, with the development of leaky cable technology, the leaky cable becomes more diverse like an antenna, and application fields of the leaky cable are constantly expanding. In the fields of 5G indoor coverage and industrial Internet of Things, a solution of wireless coverage of the leaky cable is increasingly favored by people due to a wide frequency band supported, uniform radiation, high stability and reliability. Moreover, different scenarios have different requirements for the width of the radiation lobe of the leaky cable. For example, an industrial application may require the leaky cable to have multiple optimum radiation directions without affecting each other or require the leaky cable to have a characteristic of omni-directional radiation. These special requirements cannot be satisfied by the conventional leaky cable.

SUMMARY

The disclosure aims to provide a multi-directional radiation leaky coaxial cable capable of increasing a number of radiation lobes.

A brief description in one or more aspects is made hereinafter to provide basic understanding in these aspects. This description is not an exhaustive overview in all aspects conceived, and is neither intended to identify key or decisive elements in all aspects nor attempts to define a scope in any or all aspects. The object is only to give some concepts in one or more aspects in a simplified form to give a more detailed description later.

In a first aspect of the disclosure, a multi-directional radiation leaky coaxial cable is provided, including an inner conductor, an insulating layer, an outer conductor and a sheath which are sequentially and coaxially nested from inside to outside, wherein the outer conductor is provided with at least two rows of slotted hole groups, the at least two rows of slotted hole groups are distributed at different angles in a circumferential direction of the outer conductor, each row of slotted hole group includes a plurality of slotted hole arrays which are periodically arranged along an axial direction of the outer conductor, each slotted hole array includes a plurality of slotted holes, pitches of the slotted hole groups are the same, and a periodic arrangement difference of two adjacent rows of slotted hole groups in the circumferential direction is half a pitch, so that a phase difference of respective excitation electric fields is 180°.

In an embodiment, according to the multi-directional radiation leaky coaxial cable, the slotted hole is of a non-central symmetrical shape or a central symmetrical shape inclined to the axial direction, and two adjacent slotted holes in the circumferential direction are symmetrically arranged.

In an embodiment, according to the multi-directional radiation leaky coaxial cable, the slotted hole is an L-shaped slot, a U-shaped slot, a T-shaped slot, an E-shaped slot or a triangular slot, and two adjacent slotted holes in the circumferential direction are oriented differently.

In an embodiment, according to the multi-directional radiation leaky coaxial cable, the slotted hole is a rectangular, rhombic or elliptical slot inclined to the axial direction, and inclination angles of two adjacent slotted holes in the circumferential direction are opposite.

In an embodiment, according to the multi-directional radiation leaky coaxial cable, the slotted hole is a straight slot, and two adjacent rows of slotted hole groups in the circumferential direction are arranged in a staggered manner and spaced apart by half a pitch.

In an embodiment, according to the multi-directional radiation leaky coaxial cable, an included angle $\alpha$ between two adjacent rows of slotted hole groups is equal to $\delta$, wherein $\delta$ is an included angle of a newly added radiation direction required.

In an embodiment, according to the multi-directional radiation leaky coaxial cable, a number of rows of the slotted hole groups n is equal to m, wherein m is a number of radiation lobes required.

In an embodiment, according to the multi-directional radiation leaky coaxial cable, when n is equal to 3 or 5, a slotted hole group in a middle position coincides with a middle line of a narrow edge of the outer conductor.

In an embodiment, according to the multi-directional radiation leaky coaxial cable, a distance D between the slotted hole groups on the expanded outer conductor is equal to $\alpha\pi D_{insulator}/360°$, wherein $D_{insulator}$ is an outer diameter of the insulating layer.

The embodiments of the disclosure have the beneficial effects that: multiple rows of slotted hole groups are arranged, a phase difference of two adjacent rows of slotted hole groups in the circumferential direction is half a pitch, and the phase difference of the excitation electric fields is 180°, so that source separation can be achieved in space, and excitation sources are independent and do not interfere with each other, thus increasing a number of radiation directions of all frequency points in an operating frequency band of the leaky coaxial cable, and making the leaky coaxial cable have a higher application scene applicability.

BRIEF DESCRIPTION OF THE DRAWINGS

In order to illustrate the technical solutions of the embodiments of the disclosure more clearly, the drawings which need to be used in the embodiments will be briefly introduced hereinafter. It is to be understood that the following drawings only show some embodiments of the disclosure, so that the drawings should not be regarded as limiting the scope. Those of ordinary skills in the art may further obtain other related drawings according to these drawings without going through any creative work.

After reading the detailed description of the embodiments of the present disclosure with reference to the following drawings, the above features and advantages of the disclosure can be better understood. In the drawings, the components are not necessarily drawn to scale, and the components with similar related characteristics or features may have the same or similar reference numerals.

Figure 1:
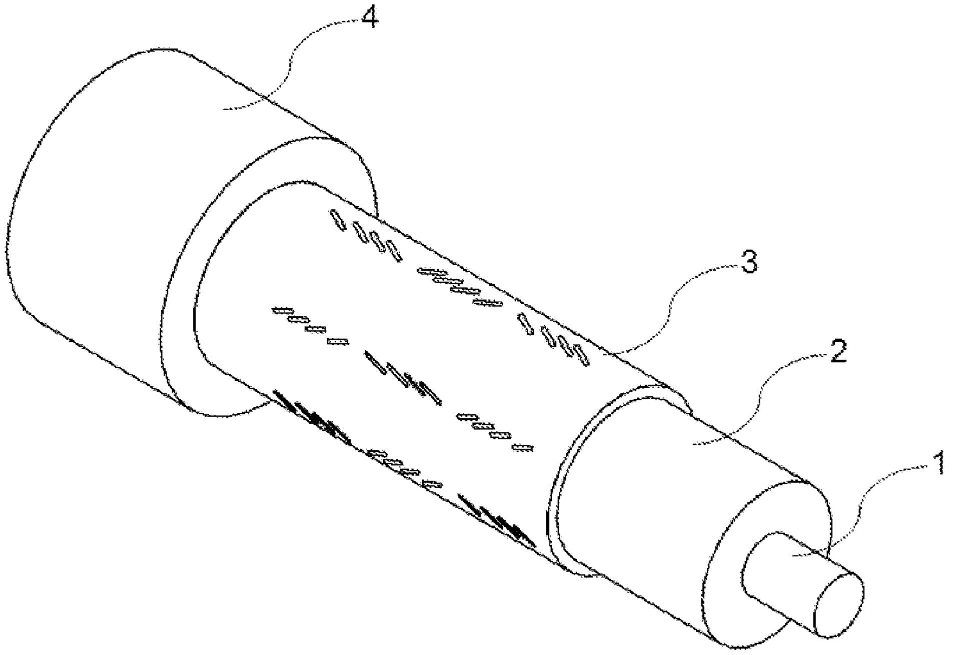
FIG. 1 is a schematic diagram of a stereoscopic structure in an embodiment of the disclosure.

In the drawings: 1 refers to inner conductor; 2 refers to insulating layer; 3 refers to outer conductor; 4 refers to sheath; 31 refers to slotted hole group; 311 refers to first slotted hole group; 312 refers to second slotted hole group; 313 refers to third slotted hole group; 32 refers to slotted hole array; 33 refers to slotted hole; 34 refers to middle line; and 35 refers to folded edge.

DETAILED DESCRIPTION

The disclosure is described in detail hereinafter with reference to the drawings and the specific embodiments. It is to be noted that the aspects described hereinafter with reference to the drawings and the specific embodiments are only exemplary, and should not be construed as limiting the scope of protection of the disclosure.

Figure 2:
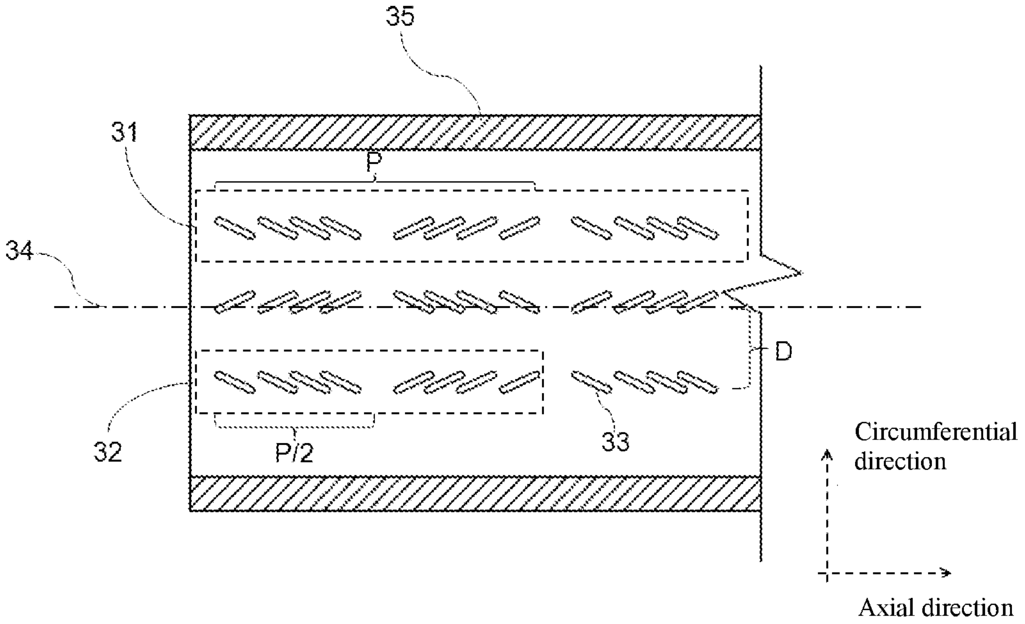
FIG. 2 is a schematic diagram of an expanded outer conductor in the embodiment of the disclosure (a slotted hole is an inverted-V-shaped slot)

As shown in FIG. 1 and FIG. 2, a multi-directional radiation leaky coaxial cable is disclosed, which includes an inner conductor 1, an insulating layer 2, an outer conductor 3 and a sheath 4 which are sequentially and coaxially nested from inside to outside. The outer conductor 3 is provided with at least two rows of slotted hole groups 31, these slotted hole groups 31 are distributed at different angles in a circumferential direction of the outer conductor 3, each row of slotted hole group 31 includes a plurality of slotted hole arrays 32 which are periodically arranged along an axial direction of the outer conductor 3, and each slotted hole array 32 includes a plurality of slotted holes 33. Pitches P of the slotted hole groups 31 are the same, and the slotted holes 33 change a direction every half a pitch P. A periodic arrangement difference of two adjacent rows of slotted hole groups 31 in the circumferential direction is half a pitch, so that a phase difference of respective excitation electric fields is 180°.

Radiation excitation of the leaky cable comes from a change of current distribution of the outer conductor caused by slotting of the outer conductor. Taking the inverted-V-shaped slot and the U-shaped slot as examples, "/" and "\", and positive U and inverted U occupy half a pitch in one pitch P respectively, and excitation electric fields generated by a cutting current has two directions with a phase difference of 180°. By making the phase difference of the excitation electric field of two adjacent rows of slotted hole groups 31 be 180°, source separation can be realized in space, so that two excitation sources are independent and do not interfere with each other (relatively speaking), thus achieving the purpose of increasing a number of radiation directions.

Figure 3:
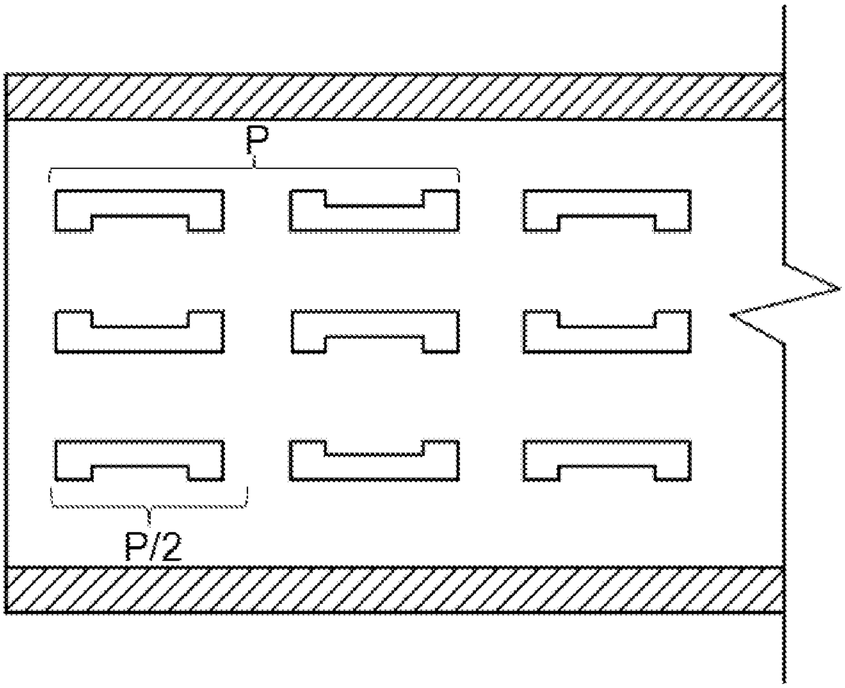
FIG. 3 is a schematic diagram of the expanded outer conductor in the embodiment of the disclosure (the slotted hole is a U-shaped slot)

The slotted hole 33 may be of a non-central symmetrical shape or a central symmetrical shape inclined to the axial direction. The slotted hole of the common non-central symmetrical shape is an L-shaped slot, a U-shaped slot, a T-shaped slot, an E-shaped slot or a triangular slot, and when the slotted hole is in these shapes, two adjacent slotted holes 33 in the circumferential direction are oriented differently. Taking the U-shaped slot as an example, as shown in FIG. 3, each row of slotted hole group 31 is periodically arranged by a fixed pitch P along the axial direction, and a positive U-shaped slotted hole and an inverted U-shaped slotted hole in one slotted hole array 32 are arranged by half a pitch. Then, only if the adjacent two rows of slotted hole groups 31 are staggered by P/2, the phase difference of the excitation electric fields of the adjacent two rows of slotted hole groups 31 in the circumferential direction may be 180°.

The central symmetrical shape inclined to the axial direction may be a rectangular (which is namely the inverted-V-shaped slot), rhombic or elliptical slot inclined to the axial direction. As shown in FIG. 2, a first half pitch and a second half pitch of the inverted-V-shaped slot are symmetrically arranged along the axial direction. In the case of staggering by P/2, inclination angles of two adjacent slotted holes 33 in the circumferential direction are just opposite. In this case, the phase difference of the excitation electric fields of two adjacent rows of slotted hole groups 31 in the circumferential direction is 180°.

Figure 4:
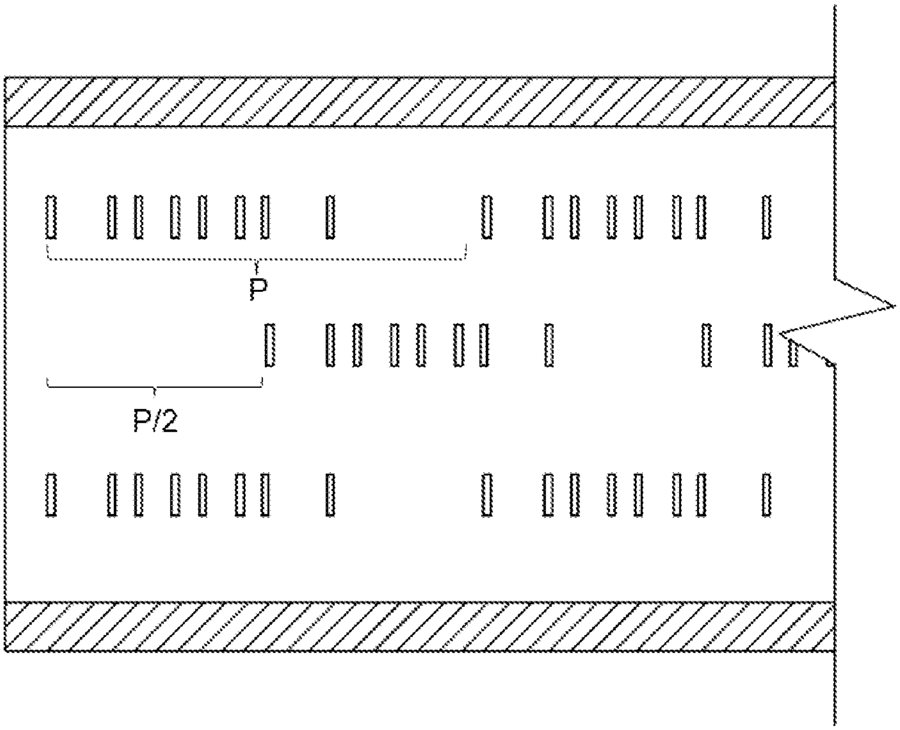
FIG. 4 is a schematic diagram of the expanded outer conductor in the embodiment of the disclosure (the slotted hole is a straight slot)

In addition, the slotted hole 33 may also be a straight slot perpendicular to the axial direction. As shown in FIG. 4, when two adjacent rows of slotted hole groups 31 are staggered by P/2 in pitch phase, the phase difference of the excitation electric fields of two adjacent rows of slotted hole groups 31 in the circumferential direction may be 180°.

The radiation direction and the number of radiation directions may be controlled by setting an included angle between the slotted hole groups 31 and a number of rows of the slotted hole groups 31. An included angle $\alpha$ between two adjacent rows of slotted hole groups 31 is equal to 6, wherein $\delta$ is an included angle of a newly added radiation direction required. A number of rows of the slotted hole groups n is equal to m, wherein m is a number of radiation lobes required.

Figure 5:
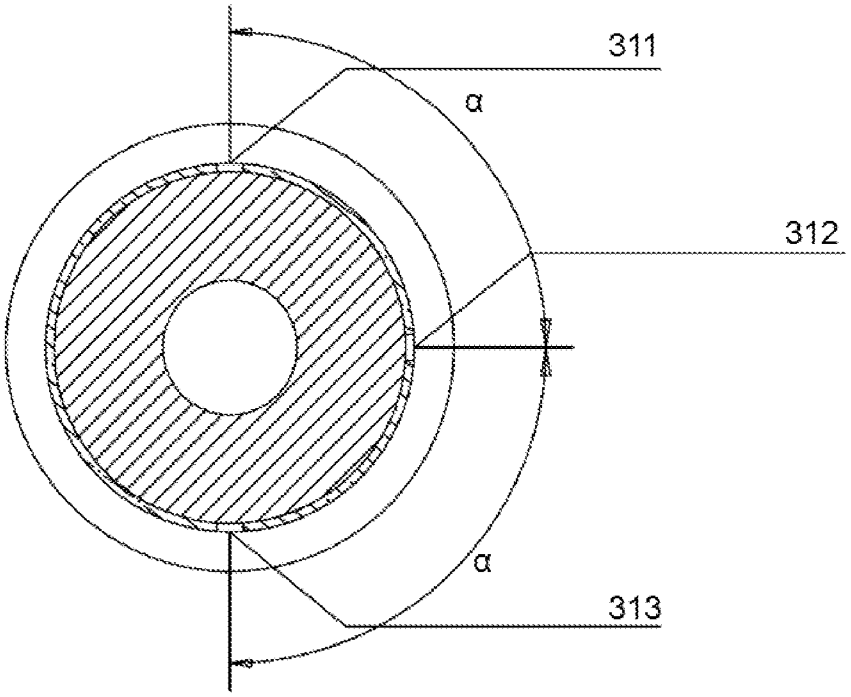
FIG. 5 is a schematic diagram of a cross section in the embodiment of the disclosure.

For example, if an insulator outer diameter of a 13/8 inch leaky cable is 42.0 mm, it is necessary to add two radiation directions, an included angle between the radiation directions and an original direction is required to be 90°, and then n=m=2+1=3, which means that a total of three rows of slotted hole groups 31 are needed. If $\alpha=\delta=90°$, as shown in FIG. 5, an included angle on a cross section of the leaky cable between newly added first slotted hole group 311 and a third slotted hole group 313 and an original second slotted hole group 312 is ±90° (minimum included angle). If $D=\alpha\pi D_{insulator}/360°=32.97$ mm, a distance of each row of slotted hole group 31 on a surface of the outer conductor is 32.97 mm. Therefore, it is necessary to add two rows of slotted hole groups with a sequence difference of half a pitch P from an original slotted hole based on an original slot, which are arranged at ±90° with the original slot, and arranged on the outer conductor before longitudinal wrapping with a design distance of 32.97 mm. It should be noted that in the present application, the distance D and the included angle α are both calculated based on a geometric center of the slotted hole 33.

In addition, it should be noted that when a number of rows of the slotted hole groups n is equal to 3 or 5 or other odd numbers, a slotted hole group 31 in a middle position should be centrally arranged. As shown in FIG. 2, the slotted hole group 31 in the middle position coincides with a middle line 34 of a narrow edge of the outer conductor, so that when the outer conductor is longitudinally wrapped, a folded edge 35 may not block the slotted hole.

The embodiments in the specification are described in a progressive manner. Each embodiment focuses on the differences from other embodiments, and the same and similar parts between the embodiments may be referred to each other.

The previous description of the present disclosure is provided to enable those skilled in the art to make or use the present disclosure. The modifications to the present disclosure will be obvious to those skilled in the art, and the general principles defined herein may be applied to other variants without departing from the spirit or scope of the present disclosure. Therefore, the present disclosure is not intended to be limited to the examples and designs described herein, but should comply with the widest scope consistent with the principles and novel features disclosed herein.

Those described above are only preferred embodiments of the present application, and are not intended to limit the present application. Any modifications, equivalent substitutions and improvements made without departing from the spirit and principle of the present application should all fall within the scope of protection of the present application.

What is claimed is:

1. A multi-directional radiation leaky coaxial cable, comprising:

an inner conductor, an insulating layer, an outer conductor, and a sheath, wherein said inner conductor, said insulating layer, said outer conductor and said sheath are sequentially and coaxially nested from inside to outside, wherein, the outer conductor is provided with at least two rows of slotted hole groups, the at least two rows of slotted hole groups are distributed at different angles in a circumferential direction of the outer conductor, each row of slotted hole group of the at least two rows of slotted hole groups comprises a plurality of slotted hole arrays which are periodically arranged along an axial direction of the outer conductor, each slotted hole array of the plurality of slotted hole arrays comprises a plurality of slotted holes, and pitches of slotted hole groups of the at least two rows of slotted hole groups are the same, and a periodic arrangement difference of two adjacent rows of slotted hole groups of the at least two rows of slotted hole groups in the circumferential direction is half a pitch, so that a phase difference of respective excitation electric fields is 180°.

2. The multi-directional radiation leaky coaxial cable according to claim 1, wherein a slotted hole of the plurality of slotted holes is of a non-central symmetrical shape or a central symmetrical shape inclined to the axial direction, and two adjacent slotted holes of the plurality of slotted holes in the circumferential direction are symmetrically arranged.

3. The multi-directional radiation leaky coaxial cable according to claim 2, wherein the slotted hole is an L-shaped slot, a U-shaped slot, a T-shaped slot, an E-shaped slot or a triangular slot, and said two adjacent slotted holes in the circumferential direction are oriented differently.

4. The multi-directional radiation leaky coaxial cable according to claim 2, wherein the slotted hole is a rectangular, rhombic or elliptical slot inclined to the axial direction, and inclination angles of said two adjacent slotted holes in the circumferential direction are opposite.

5. The multi-directional radiation leaky coaxial cable according to claim 1, wherein a slotted hole of the plurality of slotted holes is a straight slot, and two adjacent rows of slotted hole groups of the at least two rows of slotted hole groups in the circumferential direction are arranged in a staggered manner and spaced apart by half a pitch.

6. The multi-directional radiation leaky coaxial cable according to claim 1, wherein an included angle α between two adjacent rows of slotted hole groups of the at least two rows of slotted hole groups is equal to δ, wherein δ is an included angle of a newly added radiation direction required.

7. The multi-directional radiation leaky coaxial cable according to claim 1, wherein a number of rows of the slotted hole groups n of the at least two rows of slotted hole groups is equal to m, wherein m is a number of radiation lobes required.

8. The multi-directional radiation leaky coaxial cable according to claim 7, wherein when n is equal to 3 or 5, a slotted hole group of the at least two rows of slotted hole groups in a middle position coincides with a middle line of a narrow edge of the outer conductor.

9. The multi-directional radiation leaky coaxial cable according to claim 1, wherein the outer conductor is an expanded outer conductor, and wherein a distance D between the at least two rows of slotted hole groups on the expanded outer conductor is equal to $\Delta\pi D_{insulator}/360°$, wherein $D_{insulator}$ is an outer diameter of the insulating layer.

* * * * *